United States Patent [19]
Fletcher et al.

[11] 3,831,142
[45] Aug. 20, 1974

[54] METHOD AND APPARATUS FOR DECODING COMPATIBLE CONVOLUTIONAL CODES

[76] Inventors: James C. Fletcher, Administrator of the National Aeronautics and Space Administration with respect to an invention of; George D. Doland, Houston, Tex.

[22] Filed: June 28, 1972

[21] Appl. No.: 266,940

[52] U.S. Cl. ........................................ 340/146.1 AQ
[51] Int. Cl. ............................................ G06f 11/00
[58] Field of Search .......... 340/146, 347 DD; 444/1; 325/38 R; 235/155

[56] References Cited

UNITED STATES PATENTS

| | | | |
|---|---|---|---|
| 3,303,333 | 2/1967 | Massey | 340/146.1 AQ |
| 3,457,562 | 7/1969 | Fano | 340/146.1 AV |
| 3,493,929 | 2/1970 | Webb | 349/146.1 AV |
| 3,538,497 | 11/1970 | Harmon | 340/146.1 AQ |
| 3,605,090 | 9/1971 | Burton | 340/145.1 AQ |
| 3,662,338 | 5/1972 | Cain | 340/146.1 AQ |
| 3,665,396 | 5/1972 | Forney, Jr. | 340/146.1 AV |
| 3,697,947 | 10/1972 | Macy | 340/146.1 AQ |
| 3,699,516 | 10/1972 | Mecklenburg | 340/146.1 AQ |

*Primary Examiner*—Paul J. Henon
*Assistant Examiner*—Michael Sachs
*Attorney, Agent, or Firm*—Marvin J. Marnock; John R. Manning; Marvin F. Matthews

[57] ABSTRACT

This invention relates to learning decoders for decoding compatible convolutional codes. The decoder decodes signals which have been encoded by a convolutional coder and allows performance near the theoretical limit of performance for coded data systems. The decoder includes a sub-bit shift register wherein the received sub-bits are entered after regeneration and shifted in synchronization with a clock signal recovered from the received sub-bit stream. The received sub-bits are processed by a sub-bit decision circuit, entered into a sub-bit shift register, decoded by a decision circuit, entered into a data shift register, and updated to reduce data errors. The bit decision circuit utilizes stored sub-bits and stored data bits to determine subsequent data-bits. Data errors are reduced by using at least one up-date circuit.

1 Claim, 3 Drawing Figures

METHOD AND APPARATUS FOR DECODING COMPATIBLE CONVOLUTIONAL CODES

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 45 U.S.C. 2457).

BACKGROUND OF THE INVENTION

Information transmission systems have gradually improved to the point where their performance is almost equal to the theoretical limit of performance for uncoded data systems. It has been theoretically established by Shannon that further improvement in performance can be obtained by coding pulse-code-modulation (PCM) data prior to transmission. Yet, in spite of considerable effort over the last 25 years, the theoretical limit given by Shannon's theory was not achievable with known decoders.

Known decoders have many limitations including: very low data rate capability, failure to decode signals of relatively high signal-to-noise ratios, failure to recover and decode properly after a loss of signal, extreme complexity and, relatively high cost.

Accordingly, it is an object of this invention to provide a decoder which nearly approaches the theoretical limit given by Shannon's theory, which operates at the system's rate without limiting the data rate, which operates near the channel's capacity specified by Shannon's Channel Capacity Theory, and which automatically recovers operations after a loss of signal.

SUMMARY OF THE INVENTION

A method and apparatus are provided for decoding PCM information transmitted as a stream of sub-bits by using a known convolutional code. A clock signal is generated having a periodicity corresponding to the rate of the transmitted sub-bit stream. Timing signals from the clock signal are generated for controlling the decoding operations in synchronism with the incoming stream of sub-bits. Each arriving sub-bit is identified to determine whether it is a one or a zero, and the thusly identified sub-bits are stored. A predetermined sub-bit pattern is identified in the stored sub-bits to initiate the decoding operation. The errors made during the step of identifying each arriving sub-bit are corrected by using the predetermined sub-bit pattern. The predetermined data bits are stored. The next consecutive data bit to be stored is determined by using some of the stored data bits together with some stored sub-bits. Some of the stored data bits are redetermined by using some of the stored data bits together with some of the stored sub-bits thereby correcting and removing the errors from the stored data bits to provide the desired decoded PCM information.

Figure 1:
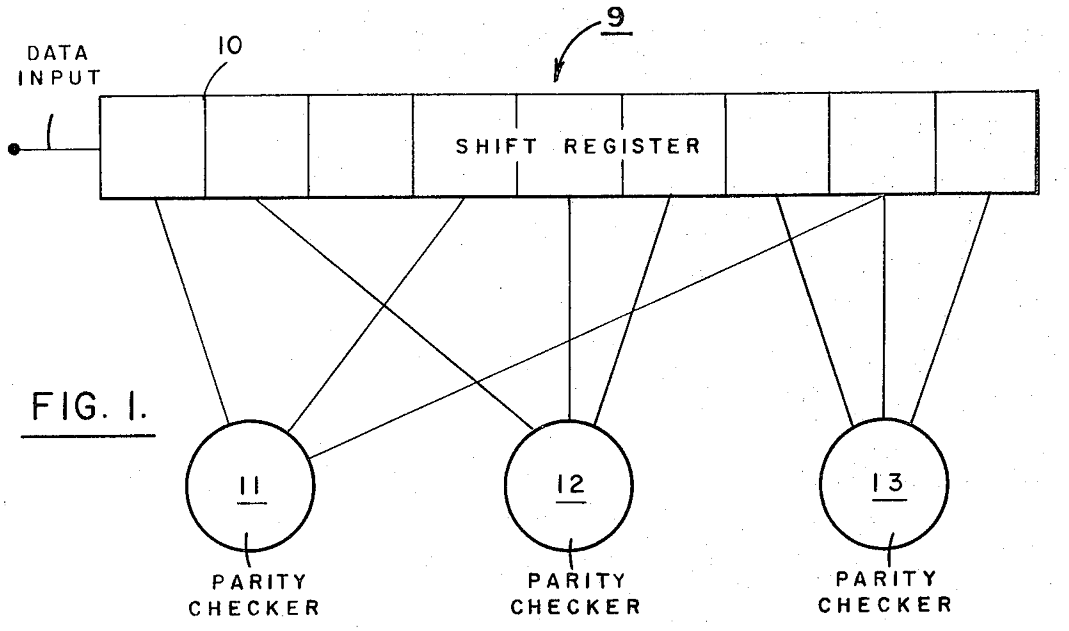
FIG. 1 shows a conventional simplified convolutional coder.

This invention will be better understood in connection with first described theoretical considerations.

In uncoded data transmission systems, the theoretical performance can be readily determined by communication engineers using either the Normal Probability of Error curve or Error Function curve. The first step is to determine the decision threshold (T) for the signal-to-noise power ratio (S/N). For optimum performance, antipodal transmission is used which effectively increases the signal power by a factor of two. For antipodal transmission:

$$T = \sqrt{2(S/N)} \qquad (1)$$

Using the mentioned curves, there is one error per million bits of information at a signal-to-noise power ratio of about 11. The signal-to-noise power ratio is usually expressed in decibels (dB). A power ratio of 11 is about 10.5 dB. The theoretical computation assumes an unlimited bandwidth but in practical systems, the bandwidth is usually limited to three times the bit rate before detection, and 1½ times the bit rate after detection for NRZ–L data.

In uncoded systems, the resulting performance is about 1 dB lower than the theoretical limit, based upon an unlimited bandwidth. This loss in performance is caused by the loss of signal power contained in the higher harmonics of the signal. Hence it is necessary to increase the signal power by 1 dB to obtain a performance equal to the "ideal" or theoretical system.

Shannon's Channel Capacity theory states that there is a maximum information rate which is the channel's capacity (C) for any noise-limited information channel. The formula for computing C is:

$$C = W \log_2 (1 + S/W\,No) \qquad (2)$$

where

W is the bandwidth and

No is the noise spectral density.

For PCM data, there is a maximum of two bits of information per cycle of bandwidth. Equation 2 can be modified to include this fact:

Thus, $$C = \tfrac{1}{2} \log_2 [1 + 2(S/N)] \qquad (3)$$

In Equation 3, the noise is measured in the transmitted bit rate bandwidth.

In coded systems, the transmitted bit rate is not the information rate. Usually the information rate is ½-to-⅓ the transmitted bit rate. To avoid confusion, the transmitted bits are referred to as sub-bits and the data bits as either bits or data bits. For a ⅓ rate system, there are three sub-bits for each data bit. Although higher or lower rates may be used, a ⅓ rate system will be illustrated for the practice of this invention.

It is now possible to compute for a ⅓ rate system the minimum signal-to-noise ratio according to Shannon's Channel Capacity Theory. From Equation 3 one obtains:

$$(2)(1/3) = \log_2 [1 + 2(S/N)]$$

and $$S/N = 0.3$$

or $$S/N = -5.2 \text{ dB} \quad (4)$$

measured in the sub-bit bandwidth. The signal-to-noise ratio measured in the data rate bandwidth is:

$$S/N = -0.5 \text{ dB}. \quad (5)$$

Therefore, according to Shannon's Capacity Theory, a signal-to-noise ratio of −0.5 dB or higher, measured in the information rate (data bit rate) bandwidth, can provide near the theoretical limit of performance for a system of rate ⅓.

For the purpose of further discussion, less than one error per million data bits will be considered error free performance. For an uncoded system, a signal-to-noise ratio of 10.5 dB is required. Consequently, the improvement theoretically possible by Shannon's Channel Theory is 11 dB for a rate ⅓ code.

Since the signal-to-noise ratio is known for the received sub-bits at the theoretical limit of performance, it is possible to compute the received sub-bit error rate. At the limit of performance, $(S/N)=0.3$ (Eq. 4), hence $T=0.78$ (Eq. 1). From the Normal Curve of Error, the probability of error is: $Pe=0.21$. Shannon's Theory indicates that no rate ⅓ system can decode the signal if the received sub-bit error rate exceeds 21 percent.

The usual method of coding to reduce transmission errors is called convolutional coding.

FIG. 1 shows a simplified design of a conventional convolutional coder 9 employing a shift register 10 and three parity checkers 11, 12 and 13. The illustration is for a rate ⅓ code. For a rate ½ code, only two parity checkers are needed; for a rate ¼, only four parity checkers are needed. The data is shifted through a shift register 10 and, as it is shifted, the parity is checked for the signals fed to the parity checkers. If the parity is even, a "zero" is transmitted, and if the parity is odd, a "one" is transmitted. The sub-bits are transmitted in sequence. The code is identified by the sequence produced by a single "one" shifted through register 10. The code for the convolutional coder 9 is 100 010 000 100 010 010 110 101 001. To simplify the code identification, octal numbers may be used. The above code written in octal form is 420 422 151.

Shannon's Channel Capacity Theory is based upon the summation of signal vectors in multi-dimensional space. The result of the summation is an improvement in the effective signal-to-noise ratio. The probability of error from the Normal Probability of Error curve can still be used to determine the bit error rate, provided the decision threshold (T) is computed from the signal-to-noise ratio after the summation process. In practical equipment, an improvement is made by the summation of the receiver sub-bit signals before regeneration. The signal voltages add because they are phase coherent; the noise power subtracts because the individual noise voltage components are not phase coherent. Using these facts, the maximum improvement theoretically possible can be computed from the weight of the code.

The weight of the code is determined by the number of "ones" in the code sequence in binary form. For the code of FIG. 1, the weight is nine. Since each sub-bit contains only ⅓ of the energy of a data bit for a rate ⅓ code, the net improvement is only ⅓ of that indicated by the weight of the code. Consequently, the net improvement for the code of FIG. 1 is three (ratio) or 4.78 dB. This number is an upper bound and the actual improvement may be less. Improvement better than indicated by Shannon's Theory cannot be obtained.

The constraint length for the coder 9 is defined by the number of data bits stored in its shift register 10 and, for the values given, the constraint length is nine. Because of the complexity of conventional decoders, the constraint length for conventional convolutional coders is usually less than ten. With this short constraint length, the weight of the code is restricted and the improvement which can be obtained is limited. As will become subsequently apparent, because of the great simplicity of the learning decoder of this invention, long constraint codes may be used with improvement near the theoretical limit. Short constraint lengths may also be used, if desired, but with less improvement and simplicity of equipment.

However, since it is desirable to achieve a large coding improvement, further description of the learning coder will be based upon a learning decoder which can provide about an eight dB improvement. In order to achieve such a high degree of decoding performance, it is first necessary to encode the data in an optimum fashion. It should be understood, however, that the learning decoder of this invention will perform even with less than optimum codes. The code is not a constraint on this invention.

Even though the coder is not part of this invention, the following information is nevertheless provided so that an optimum code may be used with the decoder of this invention.

First, the rate of the system is selected. Rate ⅓ is usually used. Second, the weight of the code is selected to provide at least the minimum performance improvement desired. For rate ⅓ codes, this weight is usually divisible by three so that each parity checker which generates the sub-bits can combine the same number of signals. The weight of the code is also generally an odd number so that a selection can be made in the decoder which is based upon the value of the majority of the signals. With an odd number of signals, there is always a dominant value. These rules will provide an equal probability of "one" or "zero" sub-bits, if the data has an equal probability of being a "one" or "zero." Another requirement for the code for optimum performance is that the code provide as many initial "ones" as the reciprocal of the rate. Thus, for a rate ⅓ code, the code must provide three "ones" at the start of the code. Finally, the auto-correlation of the "ones" in the code must be low. To meet this last requirement, it is necessary to have a relatively long constraint length. The higher the auto-correlation, the poorer the system's performance will be in the region between Shannon's theoretical bound and error free operation.

A code which meets these requirements is 712 332 101 200 404 200 110 202 040 042 expressed in octal form. It has a rate of ⅓, weight of 21, constraint length of 30, maximum auto-correlation of 3 sub-bits, and a theoretical improvement limit of 8½ dB.

The above code will provide all sub-bit "zeros" with all data "zeros," and provide all sub-bit "ones" with all data "ones." In a practical system this is undesirable if there is an idling mode with a sequence of either "ones" or "zeros" transmitted, or if data can be all "zeros" or all "ones." The problem which is encountered in practice is loss of sub-bit synchronization because of data transitions. This problem can be avoided in FIG. 1 by using the same code with the signal from one parity checker inverted relative to the other two checkers. With one or two inverted bits, the actual transmitted bit sequence does not agree with the code description and it is necessary to identify which sub-bits are inverted to make the decoder's coding improvement the same for both arrangements. A difference in performance only arises when there is a long sequence of data "ones" or "zeros."

Having described the characteristics of the optimum code, a general description of the learning decoder of this invention will now be given with reference to FIG. 2.

The learning decoder, generally designated as 24, receives an input signal 25 carrying the sub-bit stream which is to be decoded. Signal 25 is usually obtained from a receiver (not shown) which is receiving the transmitted signal from a distant signal transmitter. First, it is necessary to determine the bit rate to provide a time reference for the decoder's operation. This function is achieved by a clock generator 26. Certain basic timing functions are also required. These are produced by a timing function generator 27. The sub-bit rate is used to control a sub-bit decision circuit 28 and to shift the sub-bits stored in a sub-bit shift register 29. The sub-bit timing is also used to determine the information or data bit rate in the timing function generator 27 and to shift the data stored in a data shift register 30. The sub-bit decision circuit 28 can be similar to the data regeneration circuits used in commercial bit synchronizers.

The incoming signal 25 is analyzed, sub-bit by sub-bit, and regenerated. The regenerated signal is shifted through the sub-bit shift register 29 and is then used in the decoding process while it is stored in register 29. A decoding matrix 31 is provided which utilizes both the sub-bits in the sub-bit shift register 29 and the data bits in a data bit shift register 30. The decoding matrix 31 enters data into the data shift register 30 and also corrects some data bits which may be in error. The output of the decoder 24 is a decoded signal 32.

Figure 2:
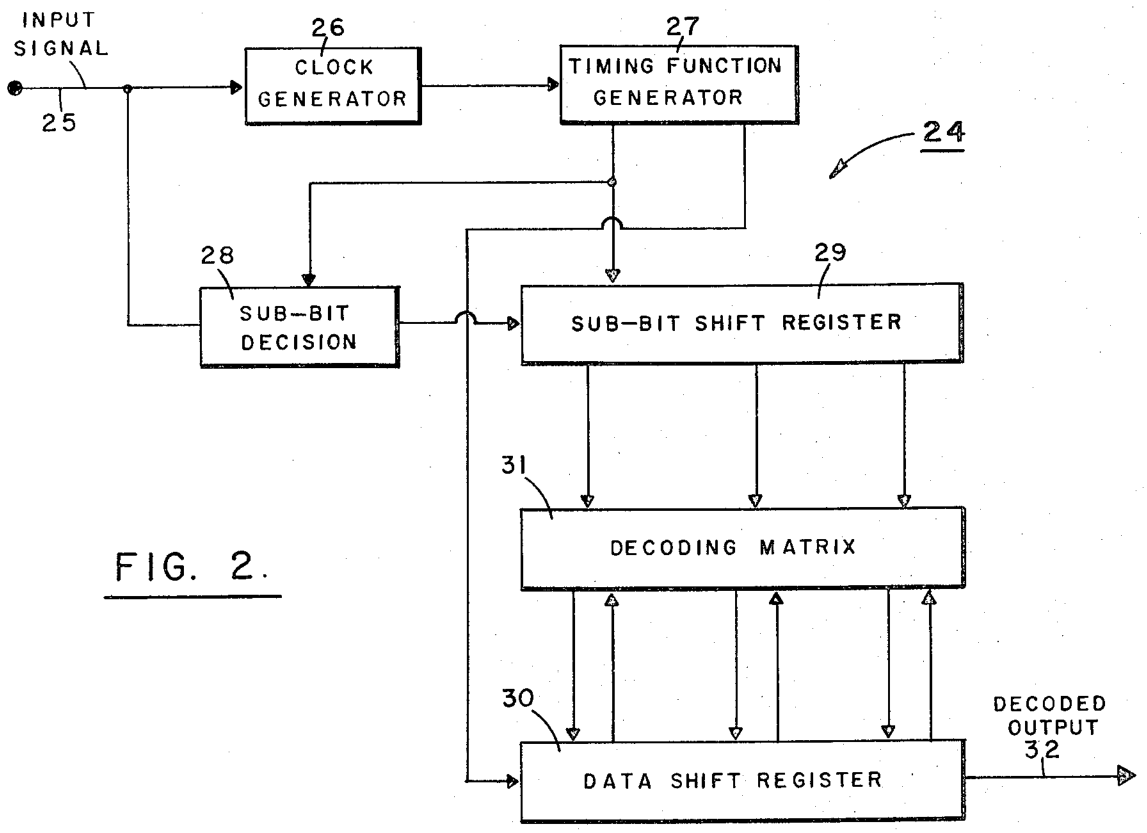
FIG. 2 is a block diagram of the decoder of this invention.
Figure 3:
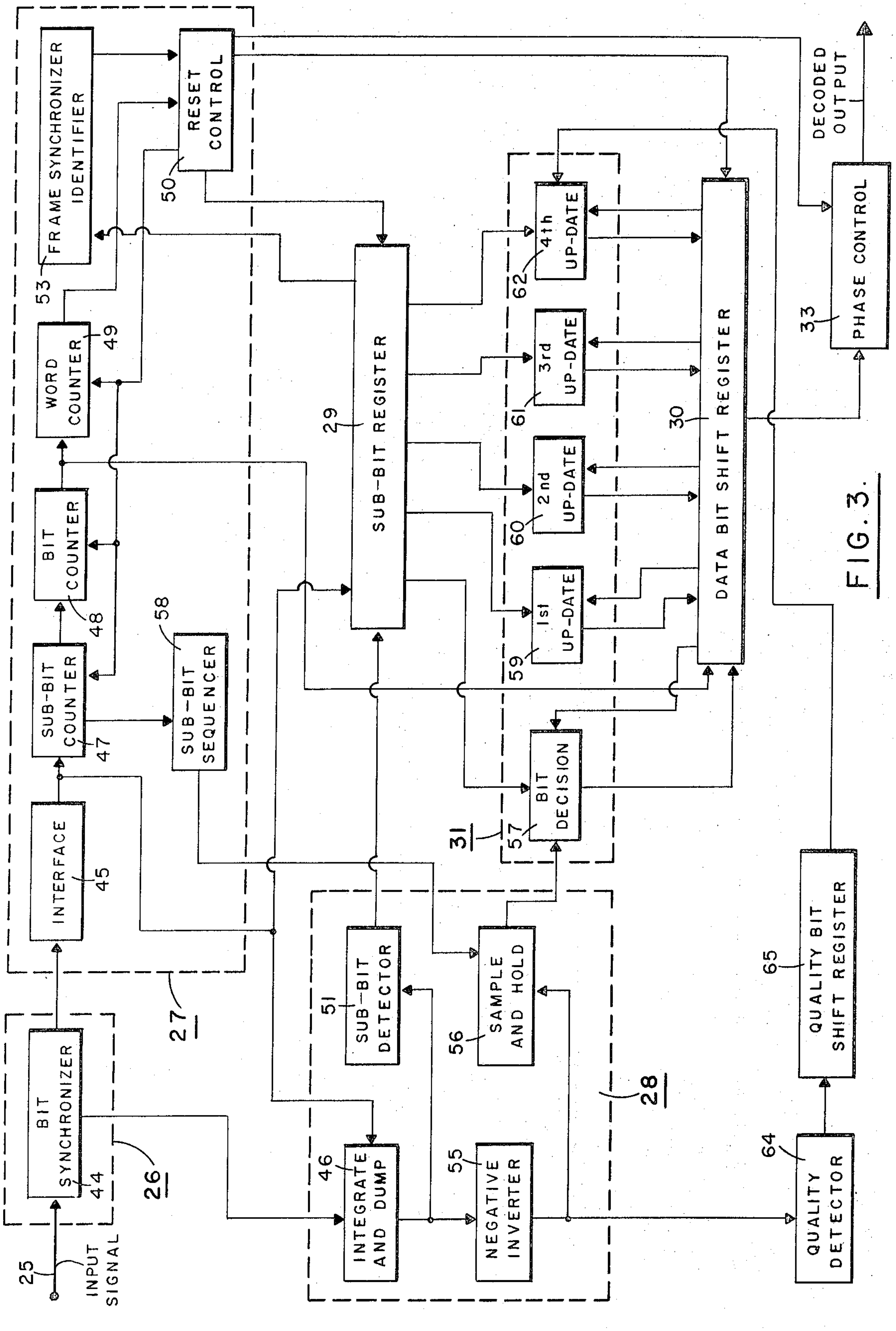
FIG. 3 shows the decoder of FIG. 2 in greater detail together with certain optional features.

To explain in detail the operation of the learning decoder 24, reference will now be had to FIG. 3 wherein the boxes formed by the dotted lines correspond to the block boxes described in FIG. 2.

The clock signal can be produced by a commercially available bit synchronizer 44 from the unprocessed sub-bit stream 25. The clock signal from the bit synchronizer 44 which may be of a type such as described in U.S. Pat. No. 3,701,894 is fed to an appropriate interface circuit 45 to insure that the equipment is compatible with the signal's source. The interface circuit 45 is often called a signal conditioner and may be of the type disclosed in the Instruction Manual for the EMR Model 2726–02 PCM Signal Conditioner published in May 1970 by EMR Division of Western Instruments, Inc. Any compensation required to adjust for delay in timing is included in the interface circuit 45. It is required that the clock timing be synchronous with the analog signal to an integrate-and-dump circuit 46 which may be of a type such as is described in U.S. Pat. No. 3,624,410. The analog signal is usually obtained from the bit synchronizer 44 and is the output from its band limiting pre-filter (not shown).

A sub-bit counter 47 counts the number of sub-bits per data bit. A bit counter 48 counts the number of bits per data word, and a word counter 49 counts the number of words per data frame. After a proper count has been reached, a reset control 50 resets counters 47, 48 and 49 back to their initial positions or zero.

The output of the integrate-and-dump circuit 46 is a voltage proportional to the integral of the analog input signal integrated for a one sub-bit period. For each clock cycle, the sub-bits are shifted one position in the sub-bit shift register 29.

In data transmission systems, a frame synchronizer (sync) pattern is also transmitted so that the data received can be correlated to specific sensors. This frame sync pattern is convoluted with the data and is not usually identifiable in the coded bit stream. When the data is encoded for use with a learning decoder, the sync pattern is initiated by a series of leading zeros. There must be a minimum number of leading zeros equal to the constraint length minus one. This separates the preceding data from the frame sync pattern. Each frame sync pattern produces a coded bit sequence which repeats each frame. A frame sync identifier 53 compares the stored sub-bit sequence in register 29 with the coded frame sync pattern. Because of errors introduced by noise, the pattern stored in register 29 will not agree exactly with the incoming signal 25. A number of errors can be tolerated and if the stored pattern agrees with the incoming signal's sequence to within the allowable number of errors, the frame sync pattern will be identified by the frame sync identifier 53 which may be of a type such as is described in U.S. Pat. No. 3,654,492.

When the frame sync pattern is identified, the reset control 50 resets the counters to zero. The reset control 50 also removes errors from register 29 and enters the decoded sync pattern into the data bit shift register 30. Each time three sub-bits are entered into the sub-bit shift register 29, the data stored in the bit shift register 30 is shifted by one bit.

The output from the integrate-and-dump circuit 46 is fed to a negative inverter 55 as well as to a sub-bit detector circuit 51. A suitable sub-bit detector circuit is disclosed in the book "Aerospace Telemetry" by Harry L. Stiltz, Vol. 1, page 170, published by Prentice Hall in 1961. The negative inverter inverts the signal when it is more negative than the one-zero crossover. The effect is to produce an output signal proportional to the absolute magnitude of the input signal 25. This output signal is sampled and stored in a sample-and-hold circuit 56. The magnitudes for the three sub-bits which are stored in the first three positions at the input end of register 29 are stored in the sample-and-hold circuit 56. These stored signals are used to make the bit decision in a bit decision circuit 57. Sub-bit timing is accomplished in a sequencer 58 which controls the sample-and-hold circuit 56. A sequencer of the type which can be used for the circuit 58 is disclosed in the publication "Aerospace Telemetry", by Harry L. Stiltz, Vol. 1 on pages 326 to 328, Prentice Hall (1961).

To better understand the operation of the bit decision circuit 57, it is necessary to refer to the method of encoding the transmitted signal. To explain the operation, a code providing a theoretical limit of 8½ dB will be used.

Consider the encoder of FIG. 1 to be extended for a constraint length of 30 bits. Also consider that thirty bits are stored in register 10, with bit No. 1 being the first bit entered at the right end (output), and bit No. 30 at the left end (input). These bits are identified as B1, B2 . . . . B30. The parity equations which are used to produce the sub-bits are:

$$S1 \overset{p}{=} B2 + B5 + B16 + B18 + B26 + B28 + B30$$
$$S2 \overset{p}{=} B1 + B9 + B15 + B21 + B25 + B28 + B30$$
$$S3 \overset{p}{=} B7 + B11 + B12 + B22 + B24 + B29 + B30$$

where:

S1, S2 and S3 are the sub-bits transmitted, and $\overset{p}{=}$ means that the sub-bit is determined by the parity of the data bits shown. If all data bits for bits B1 through B29 and the sub-bits S1, S2 and S3 are known, then the data bit B30 can be determined from one of the three parity equations. If all three parity equations agree, B30 can be determined from any equation. If they do not agree, bit B30 can be determined from the two equations which do agree. This is a majority vote decision which can be used to avoid the need for circuits 55, 56 and 58.

Better performance can be obtained by summing the analog signals algebraically. The analog signals stored in the sample-and-hold circuit 56 are identified as A1, A2 and A3. The sign associated with the analog signal is determined from the parity equations. A plus sign is used for a parity sub-bit "one" and a minus sign for a sub-bit "zero." If the analog algebraic sum is positive, a data "one" is entered in register 30 for data bit B30. If the analog algebraic sum is negative, a data "zero" is entered.

The improvement in performance using the algebraic sum of the signals can be computed with reference to Shannon's theory which indicates that the minimum signal-to-noise ratio in the data bandwidth for the desired channel capacity is −0.5 dB for the rate ⅓ code.

However, to be above Shannon's bound, consider a signal-to-noise ratio of zero dB for which the decision threshold, to compute the error probability, is 1.41 (standard deviation units). The probability of error of the bit decision is Pe(B) = 0.08. Therefore, about 8 percent of the bits are entered in error into bit shift register 30. Because six data bits are employed to determine the sign to be used based upon the parity equations, there is about a 50 percent probability that any sign will be in error. If the sign is wrong, the bit is decoded incorrectly. The channel's capacity is reached when there are sufficient data errors so that the probability of error is 50 percent for the sign obtained from the parity equations.

The probability of error for the sub-bits is computed for a signal-to-noise power ratio of ⅓. The decision threshold is 0.82 (standard deviation units). The probability of error is 0.21 for the sub-bits. When the sub-bit error rate reaches 21 percent, decoding is not possible. The probability of two or three of the received sub-bits being in error is 0.114. Therefore, when there is an algebraic summation decision, the probability of a bit error is 0.08. Bits are decoded wrong for a sub-bit error rate of 0.21, while with a majority vote decision, the decoded bit error rate is 0.114. It is necessary to reduce the sub-bit error rate to about 0.17 to have the bit error for the majority vote equal to 0.08. From the Probability of Error curve, the decision threshold for a probability of error of 0.17 is about 0.95, and the signal-to-noise power ratio is 1.35 or about 1.3 dB.

Consequently, if the analog signals summed algebraically are replaced with a majority vote decision circuit, the threshold of performance will tend to be degraded by about 1.3 dB.

Referring now again to FIG. 3, the above explains how the bit decision is made by the bit decision circuit 57 using the decoded bits (stored in the bit shift register 30) with the received sub-bits (stored in the sub-bit shift register 29), and with the analog signals (stored in the sample-and-hold circuit 56). The data in the bit shift register 30 is originally entered to start the decoding process by frame sync identification. As long as the data errors in the bit shift register 30 do not exceed the critical value, most of the errors can be removed by using up-date circuits 59, 60, 61, and 62.

The operation of the decoder of this invention will now be explained using a typical operation at a signal-to-noise ratio of 2.5 dB with the noise measured in the data bandwidth. The signal-to-noise ratio for the received sub-bits is then −2.28 dB.

Using the equations already described, the following can be obtained:

$(S/N)_b = 1.77$
$T_b = 1.88$
Pe(B) = 0.03
Pc(B) = 0.97
$(S/N)_s = 0.60$
$T_s = 1.08$
Pe(S) = 0.14
Pe(S) = 0.86

Where:

$(S/N)_b$ is bit signal-to-noise power ratio.
$T_b$ decision threshold for the data bit error probability.
Pe(B) probability of a bit error from the decision element.
Pc(B) probability of a correct bit from the decision element.
$(S/N)_s$ is the sub-bit signal-to-noise ratio.
$T_s$ decision threshold for the sub-bit error probability.
Pe(S) probability of a sub-bit error.
Pc(S) probability of a correct sub-bit.

The length of the bit shift register 30 for full utilization of the system's capability must be twice the constraint length minus one bit. For example, if the constraint length is thirty bits, the data bit shift register 30 will store a minimum of 59 data bits. At any one time, if there were no correction of the data errors entered, there would be an average of less than two errors stored. Because of the up-date circuits, the errors are reduced and are predominantly at the entrance end of the bit shift register 30. Due to the low auto-correlation of the code, the effect of decoded bit errors is minimized in decoding and the effect is relatively independent of the exact sub-bit distribution. The length of the sub-bit shift register 29 must be at least as long as the number of sub-bits transmitted while a single bit is being shifted through the sub-bit shift register.

In the example given, there are ninety sub-bits stored in the sub-bit shift register. On the average this register contains twelve to thirteen errors. These errors are not corrected and determine the performance of the decoder.

The operation of the up-date circuits will be better understood if the errors in the bit shift register are neglected. When there are 21 sub-bits shifted in the sub-bit shift register, examination of the parity equations for all 21 sub-bits will show that nine equations contain a term for the original data bit B30 in the three basic parity equations. After the data bit for the first position is entered by the bit decision circuit 57, all data bits become available to re-evaluate the original bit B30. The probability that a bit will be decided wrong can be computed from, $$Pe(K) = [N!/(K!(N-K)!)](P_e)^K(P_c)^{N-K}$$

where:

Pe($K$) is the probability of $K$ bits wrong.

Pe is the probability of bit error.

Pc is the probability of a correct bit.

$N$ is the number of bits.

$K$ is the number of bits wrong.

The computation is based upon a majority vote decision. The most significant term for computing the error probability is the combination of five wrong and four correct sub-bits when nine sub-bits are employed. Using the previously given values for the sub-bit errors, the probability of a wrong selection based upon nine sub-bits is about 3.7 ($10^{-3}$). Therefore, the error probability is reduced by nearly a factor of ten. The first up-date circuit 59 makes a majority vote decision which is based upon nine sub-bits.

Up-date circuit 60 is similar to 59 except that 15 sub-bits are used. The probability of error for circuit 60 is about 3.2 ($10^{-4}$) based upon the (assumed) 2.5 dB signal-to-noise ratio. The third up-date circuit 61 utilizes twenty-one sub-bits which is the maximum provided by the code. The result of this third up-date circuit is an error probability of about 3 ($10^{-5}$). The configuration of the learning decoder of this invention described thus far provides about 6 dB improvement over an uncoded system.

An optional feature of the learning decoder of this invention is an automatic phase control of the decoded output signal. A control signal is generated by the frame sync identifier 53. When the frame sync is found inverted, the reset control 50 is reset to provide a control signal for a phase control circuit 33 which inverts the decoded signal from the bit shift register 54. Since the phase of the decoded output signal has an equal probability of being correct or inverted, and may even change after a loss of signal, this optional feature is desirable though not fundamental to the learning decoder of this invention.

As previously mentioned, the above description of the learning decoder provides about 6 dB improvement, rather than 8 dB, which is near the limit for the selected code.

Various modifications are possible within the scope of this invention such as: the rate, constraint length, weight of the code, type of bit decision circuit, number of signals used in each up-date circuit, and the number of up-date circuits employed.

Another variation can be added to improve the decoding ability of the decoder 24. Again with reference to FIG. 3, the signal from the negative inverter 55 is fed to a level detector 64 which is a threshold device such as described in U.S. Pat. No. 3,621,308 for generating a signal when the negative inverter's output signal exceeds the desired threshold. Sub-bit analog signals above the threshold are considered of good quality and below of poor quality. The quality signal is a binary signal which is entered into a quality bit shift register 65 and stored with a one-to-one correspondence with the sub-bits in the sub-bit shift register 29. In the data bit shift register 30 a parity checker checks the parity for each parity equation used in a particular up-date circuit and the majority decision is based on every sub-bit. A fourth up-date circuit 62 is used wherein a gate deletes the parity checker's output if the quality of the sub-bit is poor. When there are a total of 21 sub-bits available, the threshold of quality detector 64 is set to delete about six sub-bits under low signal conditions.

In a typical case, after deleting about 25 percent of the sub-bits, the probability of error will be reduced by one-half. For the particular set of conditions for which calculations were made above, the error probability is reduced from 0.14 to about 0.07. Using the number of bits remaining after gating and the probability of error for these signals, the number of data errors can be reduced by a factor of about 10.

The exact number of bits which will be inhibited by a gate will vary, but an even number of bits will be fed to the majority decision circuit. Occasionally, the number will be even, and one-half will indicate a data "zero," while the other half will indicate a data "one." An odd number of bits can be assured by using the last determined value for the bit when there are an even number of signals after gating. An odd/even detector (not shown) could determine whether there is an odd or even number. If odd, a gate will prevent the addition of a tie-breaking signal. If even, a tie-breaking signal is the last decision made before the bit is up-dated. A temporary storage element may be used in some circuit configurations to hold the last evaluation of the bit, rather than to use the signal directly from the data shift register 30.

In computing the error probability, the errors in the data shift register 30 have been neglected. These errors are primarily at the entrance portion of registers and can be avoided by extending the sub-bit shift register 29, the data bit shift register 30, and the quality bit shift register 65, if used. The final up-date circuit can be placed to use the information stored in the extended portions of these shift registers while avoiding signals containing larger probabilities of error. A secondary effect of the errors in the data shift register 30 is to increase the threshold of operation. This secondary effect is, in practice, undesirable and can be reduced by using a 1/5 rate system.

What is claimed is:

1. A method for decoding PCM information represented by a sequence of data bits representing binary digits and said data bit sequence consists of a frame sync pattern of coded bits followed by a data to be conveyed which is repeated periodically, said data bit sequence being convolutionally encoded into a new sequence of binary digits represented by sub-bits, wherein each data bit is represented by a fixed plurality of sub-bits and which sub-bit sequence is transmitted by a remote transmitter to a receiver decoder for reception and decoding, said received signal being degraded by noise, and said method of decoding comprising the steps of:

1. generating a clock signal of pulses having a periodicity corresponding to the rate of sub-bits in the input sub-bit sequence to the decoder;
2. generating timing signals by counting the clock signal pulses, said timing signals including:
   a. data rate clock pulses corresponding to the rate of data bits included in said sub-bit sequence;
   b. uniformly periodic pulses at the data bit rate coincident with the sub-bits;
3. determining the value of each input sub-bit as a binary 1 or binary 0 and regenerating each bit;
4. entering the regenerated sub-bits in a sub-bit shift register which stores the sub-bits as they are shifted through the sub-bit shift register at the sub-bit clock rate of step 1;
5. detecting the presence of the frame sync pattern in the sub-bit sequence and achieving frame synchronization;
6. setting the sub-bits stored in the sub-bit shift register of step 4 to the encoded frame sync pattern of bits;
7. entering the frame sync pattern of bits into a data bit shift register using parallel input;
8. determining the data bit value as a binary 1 or binary 0 for the next data bit based upon a majority vote of the results of solving the parity equations used for coding and using the sub-bits stored in the sub-bit register and the data bits stored in the data bit shift register repetitively for each bit;
9. entering serially the data bit value determined in step 8 into said data bit shift register while shifting all data bits one position toward the exit end of the shift register at the data bit rate repetitively thereby generating additional parity equations from said original parity equations by said shifting of bits and sub-bits;
10. redetermining the data bit value, for at least one data bit per data bit period, stored in the data bit register using a majority vote of the results obtained by solving a greater number of said parity equations than used in step 8; and
11. modifying the stored data bits as redetermined in step 10, whereby the output provided by the data bit shift register is the decoded PCM information.

* * * * *